United States Patent
Kuang et al.

(10) Patent No.: US 12,211,138 B2
(45) Date of Patent: Jan. 28, 2025

(54) EDITING NEURAL RADIANCE FIELDS WITH NEURAL BASIS DECOMPOSITION

(71) Applicant: Adobe Inc., San Jose, CA (US)

(72) Inventors: Zhengfei Kuang, Stanford, CA (US); Fujun Luan, Menlo Park, CA (US); Sai Bi, San Jose, CA (US); Zhixin Shu, San Jose, CA (US); Kalyan K. Sunkavalli, San Jose, CA (US)

(73) Assignee: Adobe Inc., San Jose, CA (US)

(*) Notice: Subject to any disclaimer, the term of this patent is extended or adjusted under 35 U.S.C. 154(b) by 217 days.

(21) Appl. No.: 18/065,456

(22) Filed: Dec. 13, 2022

(65) Prior Publication Data

US 2024/0193850 A1 Jun. 13, 2024

(51) Int. Cl.
| | |
|---|---|
| *G06T 15/08* | (2011.01) |
| *G06T 15/06* | (2011.01) |
| *G06T 15/50* | (2011.01) |
| *G06T 15/80* | (2011.01) |
| *G06T 19/20* | (2011.01) |

(52) U.S. Cl.
CPC ............ *G06T 15/08* (2013.01); *G06T 15/06* (2013.01); *G06T 15/503* (2013.01); *G06T 15/80* (2013.01); *G06T 19/20* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 12,020,369 | B2 * | 6/2024 | Bigos | G06T 15/205 |
| 2017/0116755 | A1 * | 4/2017 | Imber | G06T 7/90 |
| 2019/0035149 | A1 * | 1/2019 | Chen | G06V 40/166 |
| 2022/0027659 | A1 * | 1/2022 | LeGendre | H04N 23/611 |
| 2022/0301257 | A1 * | 9/2022 | Garbin | G06N 3/045 |
| 2023/0027890 | A1 * | 1/2023 | Zhao | G06T 15/04 |
| 2023/0130281 | A1 * | 4/2023 | Brown | G06N 3/04 |
| | | | | 345/420 |
| 2023/0177771 | A1 * | 6/2023 | Assarsson | G06T 17/20 |
| | | | | 345/420 |
| 2023/0334764 | A1 * | 10/2023 | Lee | G06T 15/10 |
| 2023/0360327 | A1 * | 11/2023 | Bi | G06T 17/00 |
| 2023/0376766 | A1 * | 11/2023 | Gupta | G06N 3/082 |
| 2023/0394740 | A1 * | 12/2023 | Kim | G06T 15/08 |
| 2023/0401815 | A1 * | 12/2023 | Liu | G06V 10/56 |

(Continued)

*Primary Examiner* — David H Chu
(74) *Attorney, Agent, or Firm* — Shook, Hardy & Bacon L.L.P.

(57) ABSTRACT

Embodiments of the present disclosure provide systems, methods, and computer storage media for generating editable synthesized views of scenes by inputting image rays into neural networks using neural basis decomposition. In embodiments, a set of input images of a scene depicting at least one object are collected and used to generate a plurality of rays of the scene. The rays each correspond to three-dimensional coordinates and viewing angles taken from the images. A volume density of the scene is determined by inputting the three-dimensional coordinates from the neural radiance fields into a first neural network to generate a 3D geometric representation of the object. An appearance decomposition is produced by inputting the three-dimensional coordinates and the viewing angles of the rays into a second neural network.

20 Claims, 9 Drawing Sheets

(56) References Cited

U.S. PATENT DOCUMENTS

| | | | |
|---|---|---|---|
| 2023/0419507 A1* | 12/2023 | Planche | G06T 7/90 |
| 2024/0029333 A1* | 1/2024 | Meka | G06T 15/506 |
| 2024/0087610 A1* | 3/2024 | Mann | G06T 3/18 |
| 2024/0135721 A1* | 4/2024 | Ambrus | G06V 20/58 |
| 2024/0212252 A1* | 6/2024 | Wu | G06V 20/46 |
| 2024/0273811 A1* | 8/2024 | Radwan | G06V 10/82 |

* cited by examiner

EDITING NEURAL RADIANCE FIELDS WITH NEURAL BASIS DECOMPOSITION

BACKGROUND

Rendering, or image synthesis, is a process of generating a photorealistic or non-photorealistic image from a two-dimensional or three-dimensional model by means of a computer program. The resulting image is commonly referred to as a render or synthesized image. There are several algorithms used for rendering that employ a number of different techniques to obtain a final image. These algorithms and techniques include, but are not limited to, rasterization, ray casting, ray tracing, and neural rendering.

Neural rendering is a rendering method using artificial neural networks. Neural rendering includes image-based rendering methods that are used to reconstruct three-dimensional models from two-dimensional images. The image-based modeling and rendering (IBMR) methods rely on a set of two-dimensional images of a scene to generate a three-dimensional model and then render some novel view of the scene. IBMR methods commonly use a form of light modeling with a fundamental concept, a parameterization of a light field. The parameters include position, orientation, wavelength, and time. A neural radiance field (NeRF) is a type of IBMR method that uses fully connected neural networks to generate synthesized views of a complex three-dimensional scene using a partial set of two-dimensional images.

SUMMARY

Introduced here are techniques/technologies that use multiple neural networks to perform neural decomposition rendering that decomposes geometry from appearance. The neural decomposition system generates a three-dimensional model, representing an object's geometry, and an appearance decomposition, representing the object's appearance (e.g., color, shading). This allows for the appearance of the object to be readily edited using conventional techniques by modifying the appearance decomposition and applying those edits to the three-dimensional object.

Embodiments of the present disclosure are directed to providing mechanisms including computer-implemented methods and non-transitory computer storage media for generating and editing synthesized views of scenes by inputting image rays into neural networks with neural basis decomposition. In some embodiments, a neural decomposition rendering system collects input images of a scene depicting at least one object. The input images can be ten to hundreds of images taken of the scene at various viewing angles. Using the input images, a radiance field module generates a plurality of rays of the scene that include three-dimensional coordinates of the object as well as viewing angles relating to the position of the camera providing the input image. A scene density neural network determines a volume density of the scene by inputting the three-dimensional coordinates provided by the rays to produce a three-dimensional representation of an object in the scene. An appearance neural network generates an appearance decomposition by inputting the three-dimensional coordinates and the viewing angles provided by the rays. The appearance decomposition can decompose the colors presented on the scene into a color palette. The appearance decomposition can also decompose the shading effects presented on the scene into discrete shading terms. A volume rendering module produces an editable synthesized scene by combining the three-dimensional representation of the object and the appearance decomposition.

By separating geometry and appearance, embodiments allow users to edit the appearance of the object by editing the appearance decomposition. When a novel view is synthesized, the resulting view includes the appearance provided by the modified appearance decomposition. For example, a user can select to change an object's color from blue to red and the synthesized image can reflect those changes.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

These and other features, aspects, and advantages of the embodiments of the disclosure will become better understood with regard to the following description, appended claims, and accompanying drawings where:

Figure 1:
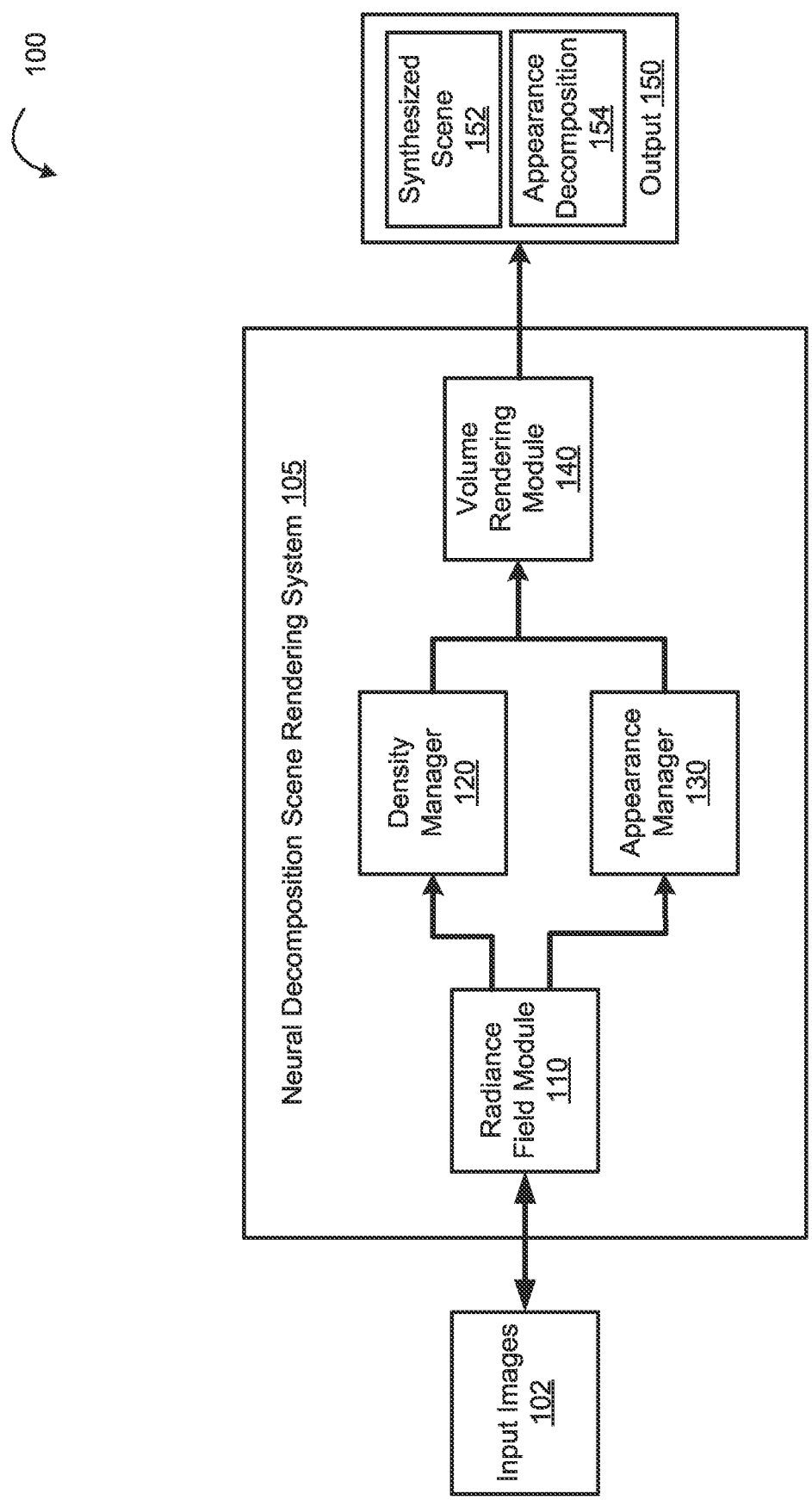
FIG. 1 is a block diagram of an architecture for neural decomposition rendering, in accordance with embodiments of the present invention.

While the present disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the present disclosure. Like reference numerals are used to designate like parts in the accompanying drawings.

DETAILED DESCRIPTION

Overview

The present disclosure relates to image rendering and, more specifically, to generating editable synthesized views of scenes by inputting image rays into neural networks using neural basis decomposition. While the present disclosure is not necessarily limited to such applications, various aspects of the disclosure can be appreciated through a discussion of various examples using this context.

Traditionally, there have been two broad categories of techniques to perform object capture (e.g., to capture a real object and digitize it such that it can be rendered in a model tool, image-editing tool, etc.). Conventional techniques include multi-view stereo or photogrammetry, where a large number of photographs are taken of an object and used to reconstruct the geometry using a mesh. The texture can be reconstructed with texture mapping. These techniques are often categorized as image-based modeling and rendering techniques.

Image-based modeling and rendering (IBMR) techniques use images as both modeling and rendering primitives that provide a simpler modeling technique suitable for representing complex scenes, and as a way to accelerate the rendering process. Image-based rendering (IBR) uses images, as opposed to polygons, as modeling and rendering primitives. In practice, many IBR approaches correspond to image-geometry hybrids, with the corresponding amount of geometry ranging from per-pixel depth to hundreds of polygons. Image-based modeling (IBM) refers to the use of images to drive the reconstruction of three-dimensional geometric model.

Light field interpolation is a common IBMR technique that describes, for any given point, the radiance perceived in a particular direction in free space (this is equivalent to a plenoptic function) when given a dense sampling of views. Light field and lumigraph rendering create novel views of scenes/objects by resampling a database of images representing a discrete sample of the plenoptic function. For each pixel of the novel view, a computation is performed relating to the intersections of the corresponding viewing ray with the camera and focal planes. The camera plane coordinates (u,v) of the intersection are used to select the image(s) to be used for resampling. The focal plane coordinates (s,t) of the intersection are used to select the actual pixel(s) from the selected image(s). Resampling techniques such as nearest neighbor or quadrilinear interpolation can be used.

Newer techniques have utilized neural networks, rather than meshes, to perform object capture. For example, a neural network can be used to encode the geometry and appearance of an object and can be used to render the object in an environment. One such technique is the neural radiance field ("NeRF") that synthesizes novel views of complex scenes by optimizing an underlying continuous volumetric scene function using a sparse set of input views. The NeRF algorithm represents a scene using two fully connected (non-convolutional) deep networks, whose input are continuous coordinates consisting of a spatial location and viewing direction. The output of one of the networks is the volume density and the other is a view-dependent emitted radiance at that spatial location. The synthesized views are generated using classic volume rendering techniques to project the output colors and densities into an image.

Limitations on IBMR techniques remain, however, as neural techniques present a black box function that renders a realistic 3D version of a given scene but lacks the capabilities to allow the appearance of that scene to be edited. Approaches like NeRF and Deep Reflectance Volumes that leverage differentiable volume rendering (e.g., ray marching) have the ability to generate highly detailed synthesized views of a scene. However, these volume-based methods entangle both geometry and appearance in a black box volume encoding neural network. By doing so, the techniques do not allow for easy editing, which significantly limits the practicality of these neural rendering approaches.

Since the NeRF model predicts the color from only a single source (i.e., the color multilayer perceptron), it is not straightforward to decompose the appearance of the captured scene into different parts. This makes NeRF unsuitable for editing applications, such as changing the color of an object appearing in the scene while keeping other parts of the scene unchanged.

Embodiments of the present disclosure overcome the above and, other problems, by making the appearance of a synthesized scene editable. For example, embodiments improve the NeRF architecture by introducing neural basis decomposition. Using neural basis decomposition, embodiments provide mechanisms for view-consistent appearance editing of a synthesized scene given a set of multi-view images of a scene. Neural basis functions are utilized to represent a specific view-dependent shading effect of the appearance of the synthesized scene. In some embodiments, a neural basis function is represented by a color palette model that provides a color prediction mechanism producing a weighted sum of multiple color outputs. In some other embodiments, a neural basis function is a frequency-based decomposition model that replaces the color prediction mechanism of NeRF that provides a mechanism for decomposing the scene appearance into different shading terms (e.g., diffuse and specular terms).

More specifically, embodiments improve upon prior techniques by introducing neural basis decomposition into a fully connected neural network to change the appearance of an object in a scene while leaving other objects unchanged. For example, embodiments replace the color prediction of NeRF with neural basis functions that allow for colors and/or shading of a synthesized scene to be editable. In some embodiments, the neural basis function has two parameters: a global parameter representing the fundamental properties of the basis (e.g., the colors of a color palette) and an influence parameter representing the influence of a basis at a certain 3D point.

In some embodiments, the neural basis function is represented by a color palette model. The color palette model can include a global property of each basis defined as an RGB value with an influence function as a multilayer perceptron ("MLP") to predict a monochromatic radiance value. In some cases, the neural basis function is the product of the RGB value and the monochromatic radiance value. A blending weight MLP and a phase function MLP can be used to predict a position and monochromatic radiance value. An optimization parameter can be used in conjunction with the position and monochromatic values to produce an output color that is the weighted sum of the colors of each basis.

In some embodiments, the neural basis function of a frequency-based decomposition model is used to decompose the scene appearance into different shading terms. In such cases, each neural basis represents a shading component for a specific frequency domain. The higher the frequency is, the glossier the shading effect should be. Specifically, the frequency-decomposition model controls the frequency domain of a neural basis by adding a basis property to Sinusoidal Positional Embedding of a viewing direction.

The techniques described herein provide various improvements over conventional methods. For example, embodiments generating an editable synthesized scene by integrating appearance decomposition in NeRF-based methods provide more efficient interaction mechanisms over the prior art. These interaction mechanisms allow users to edit complex synthesized scenes while avoiding unwanted artifacts. Embodiments that support color editing provide a more efficient color editing mechanism that not only edits the color of an object but also edits the reflection of that color on a surface. The color editing mechanism allows for multiple scene locations to be editable as they relate to the originating color. Furthermore, by applying neural basis functions for appearance decomposition, the present techniques provide a more efficient and robust editing technique to achieve high-quality and view-consistent appearance editing on a synthesized scene.

Example Scene Rendering Environment

Referring now to FIG. 1, a block diagram of an example scene rendering environment 100 suitable for use in implementing embodiments of the disclosure is shown. Generally, the scene rendering environment 100 is suitable for generating editable synthesized scenes from a set of images of a scene. The scene rendering environment 100 includes input images 102, a neural decomposition scene rendering system 105, and an output 150. The neural decomposition scene rendering system 105 includes a radiance field module 110, a density manager 120, an appearance manager 130, and a volume rendering module 140.

FIG. 1 illustrates a diagram of an architecture for neural radiance field rendering with neural appearance decomposition in accordance with embodiments of the present disclosure. The scene rendering environment 100 uses a plurality of machine learning models to generate a volumetric representation of an object in a plurality of input images, where the object's appearance is decomposed from the volumetric representation. The appearance decomposition allows volume rendering to reconstruct the scene from multi-view images while allowing for the object's appearance (e.g., color, shading) to be editable using conventional techniques. As such, once the neural networks are trained, a photorealistic novel perspective of the scene can be generated where the appearance of the novel perspective is editable by a user.

The scene rendering environment 100 can be implemented as a standalone application or as part of another application or suite of applications. For example, in some embodiments, the scene rendering environment 100 is implemented as part of a graphics design application, enabling the scene geometry and appearance to be obtained and edited by the user in the graphics design application. Alternatively, once the appearance decomposition mapping is generated by the scene rendering environment 100, it can be provided to a graphics design application for editing by the user.

As an exemplary implementation and operation of the scene rendering environment 100, the neural decomposition scene rendering system 105 receives the input images 102. As discussed further below, the neural decomposition scene rendering system 105 is trained using a plurality of input images of a scene. In some examples, the input images include hundreds of images of the scene. The scene includes an object or objects represented in the input images. For example, the input images include a representation of the object(s) captured from various angles (e.g., different camera positions). The images can be captured using an image-capturing device, such as an image or video camera (e.g., a standalone camera or a camera integrated into other devices such as a mobile device, tablet, and the like).

The radiance field module 110 implements ray marching techniques to generate rays that pass through each pixel and sample the ray at a plurality of 3D points. The result is a plurality of neural radiance fields, each having a three-dimensional coordinate and a viewing direction. The neural radiance fields are provided to a plurality of neural networks to produce an editable synthesized scene. Unlike prior techniques using neural radiance fields, which use two separate neural networks (density MLP and color MLP to represent scene geometry (density MLP) and appearance (color MLP) separately, embodiments described herein augment the color MLP with multiple neural networks (neural basis MLPs) for the scene appearance (in addition to the color MLP). These neural networks can represent a decomposed basis of the 3D scene appearance. As discussed, instead of training neural networks to determine a static radiance and color of a scene, embodiments train neural networks to decompose the appearance so that the scene's colors and/or shading is editable.

For example, the appearance manager 130 includes one or more neural networks to generate a weighted sum of multiple color outputs (e.g., RGB values) based on a 3D coordinate and viewing direction. As discussed further below, this can include neural networks to associate the neural radiance field coordinates with a color palette of the scene. Additionally, the density manager 120 includes a neural network to model the scene geometry by calculating the volume density of a given 3D point taken from the neural radiance fields.

In various embodiments, the neural networks described herein can be implemented as multilayer perceptrons (MLPs), convolutional neural networks (CNNs), or other neural networks. Alternatively, some neural networks can be implemented as MLPs while other are implemented as CNNs or other combinations of neural networks. A neural network can include a machine learning model trained on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning, that utilizes a set of algorithms to attempt to model high-level abstractions in data.

The resulting volume density values from the density manager 120 and the appearance decomposition from the appearance manager 130 are provided to the volume rendering module 140. The volume rendering module 140 implements conventional volume rendering techniques to generate the output 150. This includes generating a synthesized scene 152 at the appropriate viewpoint. The volume rendering module 140 generates an editable output image because the appearance is decomposed into appearance decomposition 152, thereby allowing conventional editing techniques to change the appearance of an object on the synthesized scene 152.

Embodiments employ any of a variety of different volume rendering frameworks. For example, in addition to NeRF, embodiments can be combined with Neural Reflectance Fields to reconstruct BRDF parameters, enabling both view synthesis and relighting. Additionally, embodiments are able to decompose appearances, such as the color and shading of a scene, to enable editing of those appearances in editing applications.

Figure 2:
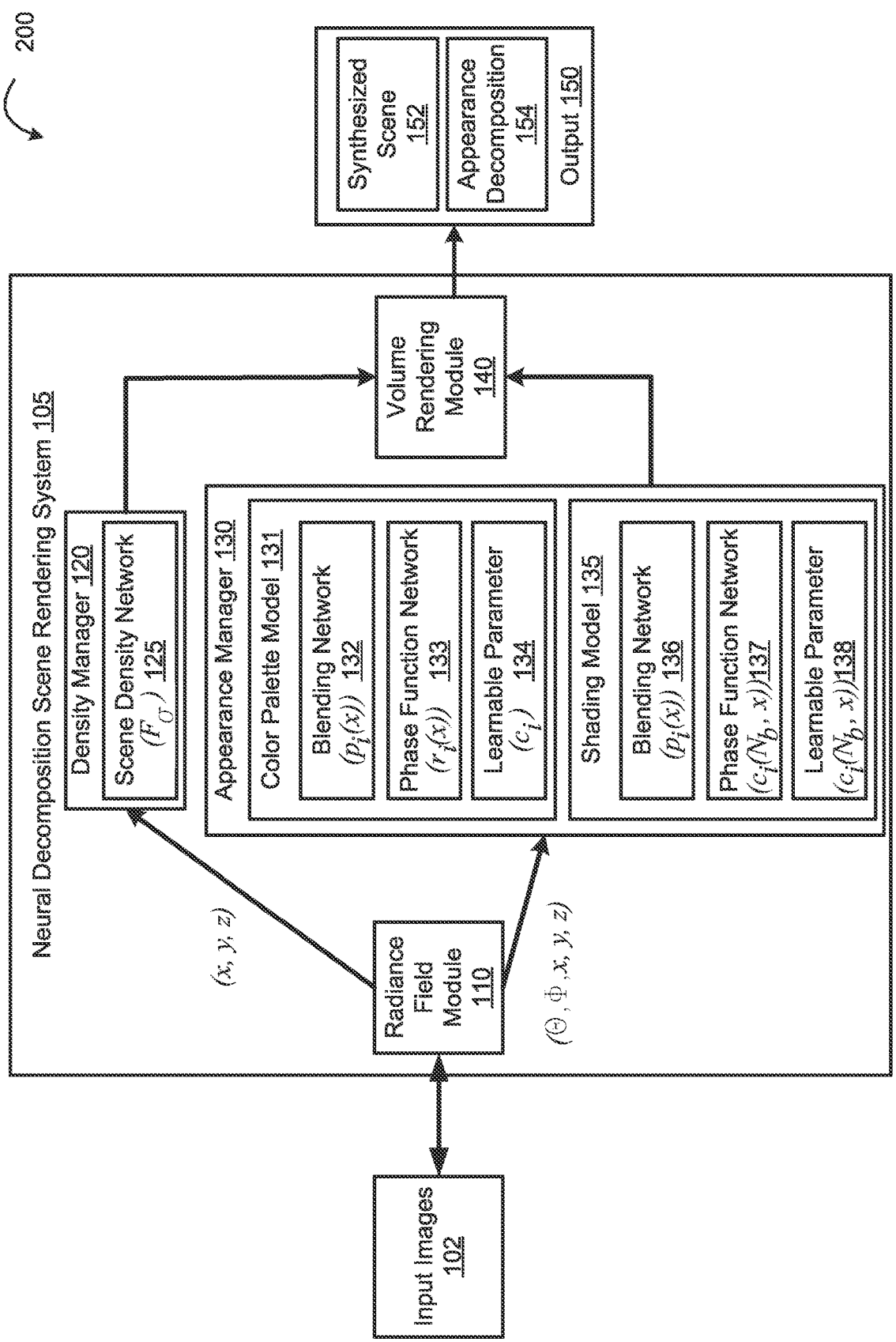
FIG. 2 is a block diagram of an architecture for neural decomposition rendering, in accordance with embodiments of the present invention.

FIG. 2 illustrates a diagram of an architecture for the neural decomposition scene rendering system 105 in accordance with one or more embodiments of the present disclosure. As discussed, embodiments use multiple neural networks to construct a scene geometry and appearance for a given view of a scene. As shown in FIG. 2, embodiments use an appearance manager 130, including a color palette model 131 and a shading model 135. The color palette model 131 includes a blending weight neural network ($p_i$) 132, a phase function neural network ($r_i$) 133, and a learnable parameter ($c_i$) 134. The shading model 135 includes a blending weight neural network ($p_i$) 136, a phase function neural network ($c_i(N_d, x)$) 137, and a learnable parameter ($c_i(N_b,x)$) 138. This combination of networks enables the scene appearance to be decomposed from the scene geometry, allowing for appearance editing in the appearance space.

As in prior techniques, such as NeRF, for geometry calculations, a scene density network $F_\sigma$ 125 is used to regress the volume density σ at any 3D point x=(x, y, z). In contrast to prior techniques, for appearance, a plurality of models is used. For example, a color palette model $f_c(x, d)$ 131 is used to decompose the colors of a scene, and a shading model $f_s(x, d)$ 135 is used to decompose the shading effects of a scene using the 2D view-dependent radiance given a viewpoint d=(0, 0).

Since previous appearance editing techniques utilize neural networks to predict an appearance (e.g., static color and/or shading), they are not able to decompose the appearance of a capture scene into different parts, which are required for downstream graphics editing applications. For example, changing the color of an object appearing in the scene while maintaining the color of the other objects unchanged. In some embodiments, the color palette model 131 utilizes a blending neural network 132, a phase function neural network 133, and a learnable parameter 134 to product a summation of colors for each basis to produce a color palette of the scene. In the color palette model 131, the global property of each basis Bi is defined as an RGB value $c_i$, and the φ function is a neural network (e.g., an MLP) predicting monochromatic radiance values $r_i$. The neural basis function B can be the product of $c_i$ and $r_i$. As shown, the blending network 132 is trained to predict $p_i$, and the phase function neural network 133 is trained to predict $r_i$ given inputs of a 3D point (θ, φ, x, y, z) with optimization being performed by the learnable parameter $c_i$ 134. The output color C produced by the color palette model 131 can be the summation of the colors of each basis, which is the product of $p_i$, $r_i$, $c_i$ together.

In some embodiments, the shading model 135 decomposes a scene's appearance into different shading terms (e.g., diffuse and specular terms). Each neural basis can represent a shading component for a specific frequency domain. The higher the frequency is, the glossier the shading effect is. Specifically, the shading model 135 controls the frequency domain of a neural basis by adding the basis property θ to the Sinusoidal Positional Embedding of a viewing direction r. The embedding is changed such that $θ_i$ becomes a scalar parameter between 0 and 1. $φ_i$ is set to the blending weight neural network 136 and the phase function neural network 137 with the updated position embedding. Accordingly, the color palette model 131 produces a color decomposition, and the shading model 135 produces a shading decomposition that can support realistic rendering while also allowing for appearance editing of the color and/or shading appearance of a synthesized object in a rendered scene.

Figure 3:
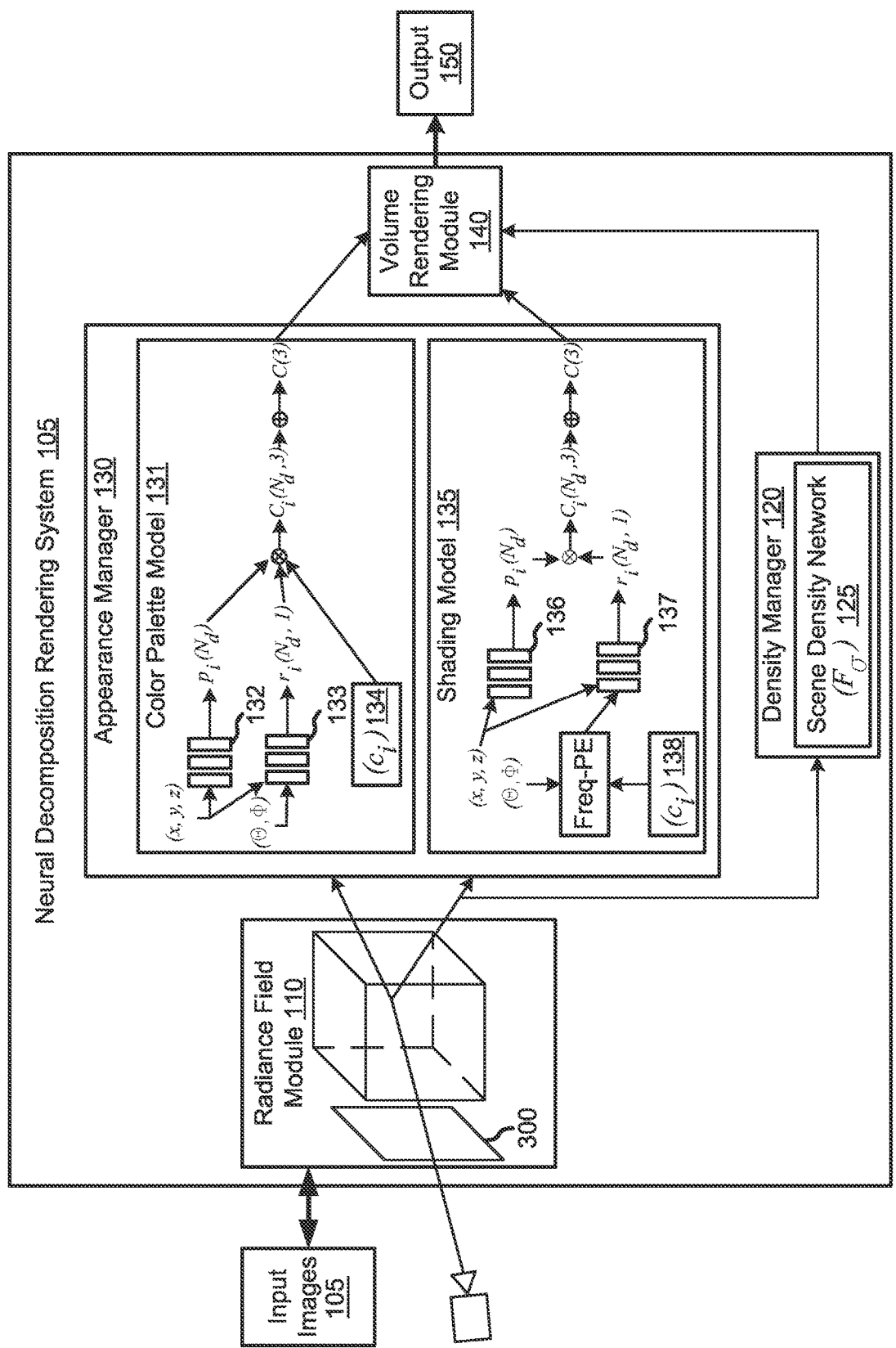
FIG. 3 is a block diagram of a neural decomposition rendering system, in accordance with embodiments of the present invention.

FIG. 3 illustrates an example of the neural decomposition scene rendering system 105 in accordance with embodiments of the present disclosure. As discussed, embodiments can be implemented based on a rendering pipeline called differentiable ray marching, where, instead of using a mesh, a neural network is used to regress the volume at any point. The properties required by this process can include the radiance (e.g., the color) at any point in the space and the volume density at any point in the space. The volume density indicates if there is anything at a point (and if so, its density), and then the radiance (e.g., RGB) indicates the color at that point. As discussed, prior techniques used neural networks to encode color and volume density statically, which does not allow the resulting object's appearance to be edited.

As shown in FIG. 3, embodiments include a decomposed neural representation comprising multiple neural networks (e.g., MLPs, CNNs, or combinations of these and/or other neural networks) for neural decomposition rendering. As in prior techniques, such as NeRF, for geometry calculations, a scene density network $F_\sigma$125 is used to regress the volume density a at any 3D point x=(x, y, z). In contrast to prior techniques, for appearance, a plurality of models are used. For example, a color palette model $f_c(x, d)$ 131 is used to decompose the colors of a scene, and a shading model $f_s(x, d)$135 is used to decompose the shading effects of a scene using the 2D view-dependent radiance given a viewpoint d=(θ,φ).

In some embodiments, the networks of the neural decomposition scene rendering system 105 are trained for a specific scene. The input images 102 include images of the scene captured from various viewpoints. The images may be captured by a user using an image capture device. This can be performed freehand (e.g., the user holding the image capture device and capturing images from different viewpoints) or via a computer-controlled mount (e.g., a robotic arm) which allows for precise positioning of the image capture device during image capture.

In some embodiments, the volume rendering module 140 utilizes the following techniques. Volume rendering can require volume density σ and radiance c at all 3D locations in a scene. A pixel's radiance value (RGB color) I is computed by passing a ray from the pixel and aggregating the radiance values of multiple shading points on the ray, as expressed by:

$$I = \sum_i T_i(1 - \exp(-\sigma_i \delta_i))c_i$$

where:

$$T_i = \exp\left(-\sum_{j=1}^{i-1} \sigma_j \delta_j\right)$$

Where i=1, . . . , N denotes the index of a shading point on the ray, $δ_i$ represents the distances between consecutive points, $T_i$ is known as the transmittance, and $σ_i$ and $c_i$ are the volume density and radiance (e.g., extinction coefficient), respectively, at shading point i. The above ray-passing process is derived as a discretization of a continuous volume rendering integral.

In the context of view synthesis, a general volume scene representation can be seen as a 5D function (e.g., a radiance field):

$$F_{\sigma,c}:(x,d) \to (\sigma,c)$$

which outputs volume density and radiance (σ, c) given a 3D location x=(x, y, z) and viewpoint d=(θ, φ). As discussed, prior techniques use a neural network for the scene appearance and another network for scene geometry. However, these techniques generate the scene content statically and do not allow for any applications (e.g., appearance editing) beyond pure view synthesis. In contrast, embodiments described herein decompose the appearance of a scene using multiple neural networks that allow for appearance editing.

In contrast, embodiments described herein explicitly decompose the radiance field $F_{\sigma,c}$ into two components, $F_\sigma$ and $F_c$, modeling geometry and appearance, respectively:

$$F_\sigma: \to \sigma, F_c:(x,d) \to c$$

In particular, $F_\sigma$ regresses volume density (i.e., scene geometry), and $F_c$ regresses radiance (i.e., scene appearance). As discussed, these are implemented as two independent networks.

Since the original NeRF model predicts the output color from only a single source (i.e., the color MLP), it is not able to decompose the appearance of the captured scene into different parts. As such, the neural decomposition rendering system 105 replaces the color prediction of NeRF with the weighted sum of multiple color outputs. Specifically:

$$F_c(x, d) = \sum_{i=1}^{N_b} B(\phi_i(x, d, \theta_i), \theta_i) p_i(x)$$

where $p_i(x)$ is the blending weight of the i'th basis at the 3D point x, and $B(\phi_i(x, d, \theta_i), \theta_i)$ is the neural basis function. The neural basis function has two parameters: a global parameter θ, which represents the fundamental properties of the basis. For example, the colors of the color palette), and a function $\phi(x, d, \theta_i)$, representing the influence of basis B at a certain 3D point. The result is an appearance decomposition decomposed from the scene.

In some embodiments, the neural decomposition rendering system 105 provides a color palette model 131 that produces an appearance decomposition resulting in editable colors within a synthesized scene. In the color palette model 131, the global property of each basis $\theta_i$ is defined as an RGB value $c_i$ and the $\phi$ function is an MLP predicting monochromatic radiance value $r_i$. The neural basis function B is the product of $c_i$ and $r_i$. As illustrated in FIG. 3, two MLPs (i.e., the blending weight neural network 132 and the phase function neural network 133) are trained to predict $p_i$ and $r_i$, respectively, given inputs of a ray providing 5D coordinates (θ, φ, x, y, z) and optimized with learnable parameter $c_i$ as a global parameter. The output color C is the sum of the colors of each basis, which is the product of $p_i$, $r_i$, $c_i$ together.

In some embodiments, the neural decomposition rendering system 105 provides a shading model 135 that produces an appearance decomposition resulting in editable shading effects within a synthesized scene. The shading model 135 decomposes the scene appearance into different shading terms. In this case, each neural basis represents a shading component for a specific frequency domain. The higher the frequency is, the glossier the shading effect should be. In the shading model 135, the global property of each basis $\theta_i$ is defined as an RGB value $c_i$ and the $\phi$ function is an MLP predicting frequency $c_i(N_d, 3)$. Specifically, the shading model 135 controls the frequency domain of a neural basis by adding the basis property θ to the Sinusoidal Positional Embedding of a viewing direction r. The embedding is changed from:

$$z(r) = \{\sin(2^d r), \cos(2^d r), d \in 0 \ldots D\}$$

to $$z_i(r) = \{\sin(2^d r) * \theta_i^d, \cos(2^d r) * \theta_i^d, d \in 0 \ldots D\}$$

where $\theta_i$ becomes a scalar parameter between 0 and 1. $\phi_i$ is set to the NeRF's color MLP with the updated position embedding (Freq-PE), and B becomes the identify function.

Figure 4:
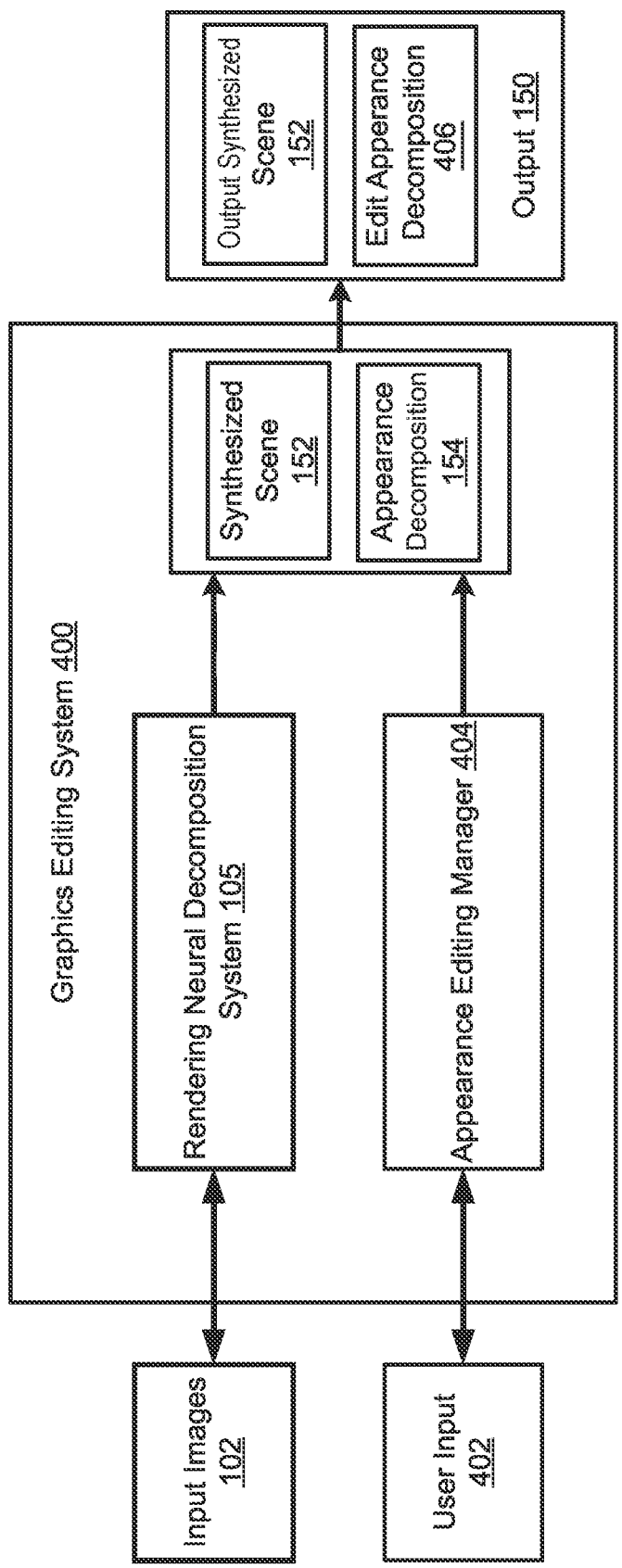
FIG. 4 is a block diagram of an example of editing a synthesized scene with neural decomposition, in accordance with embodiments of the present invention.

FIG. 4 illustrates an example of a graphics editing system 400 for editing a neural scene representation, in accordance with embodiments of the present disclosure. As discussed, techniques described herein enable the appearance of a synthesized scene decomposed from objects within the synthesized scene, allowing for the appearance to be edited using conventional techniques. Accordingly, in some embodiments, a user can provide a plurality of input images 102 to train the networks of the neural decomposition scene rendering system 105 to generate a synthesized scene 152 (e.g., a 3D volume of an object portrayed by the input images 102) and an appearance decomposition 154 decomposing the appearance of the scene depicted in the input images 102. As shown in FIG. 4, in some configurations, the neural decomposition scene rendering System 105 is implemented as part of a graphics editing system 400. In other configurations, the neural decomposition scene rendering system 105 is implemented as a separate system that provides at least the synthesized scene 152 and/or the appearance decomposition 154 to the graphics editing system 400 to be edited by the user.

Once the appearance decomposition 154 representing the appearance of at least one object in a synthesized scene has been obtained by the graphics editing system 400, the appearance decomposition 154 can be edited by the user. For example, a user input 402 can be received by an appearance editing manager 404 of the graphics editing system 400. The user input 402 can include any appearance editing inputs, such as, for instance, directly editing the appearance decomposition 154, to generate an edited appearance decomposition 406 that can be applied to the synthesized scene 152. Once the appearance editing is complete, the edited appearance decomposition 406 is outputted and can be used in combination with the synthesized scene 152 to synthesize an output synthesized scene 408 based on a provided viewpoint with the edited appearance applied.

Figure 5:
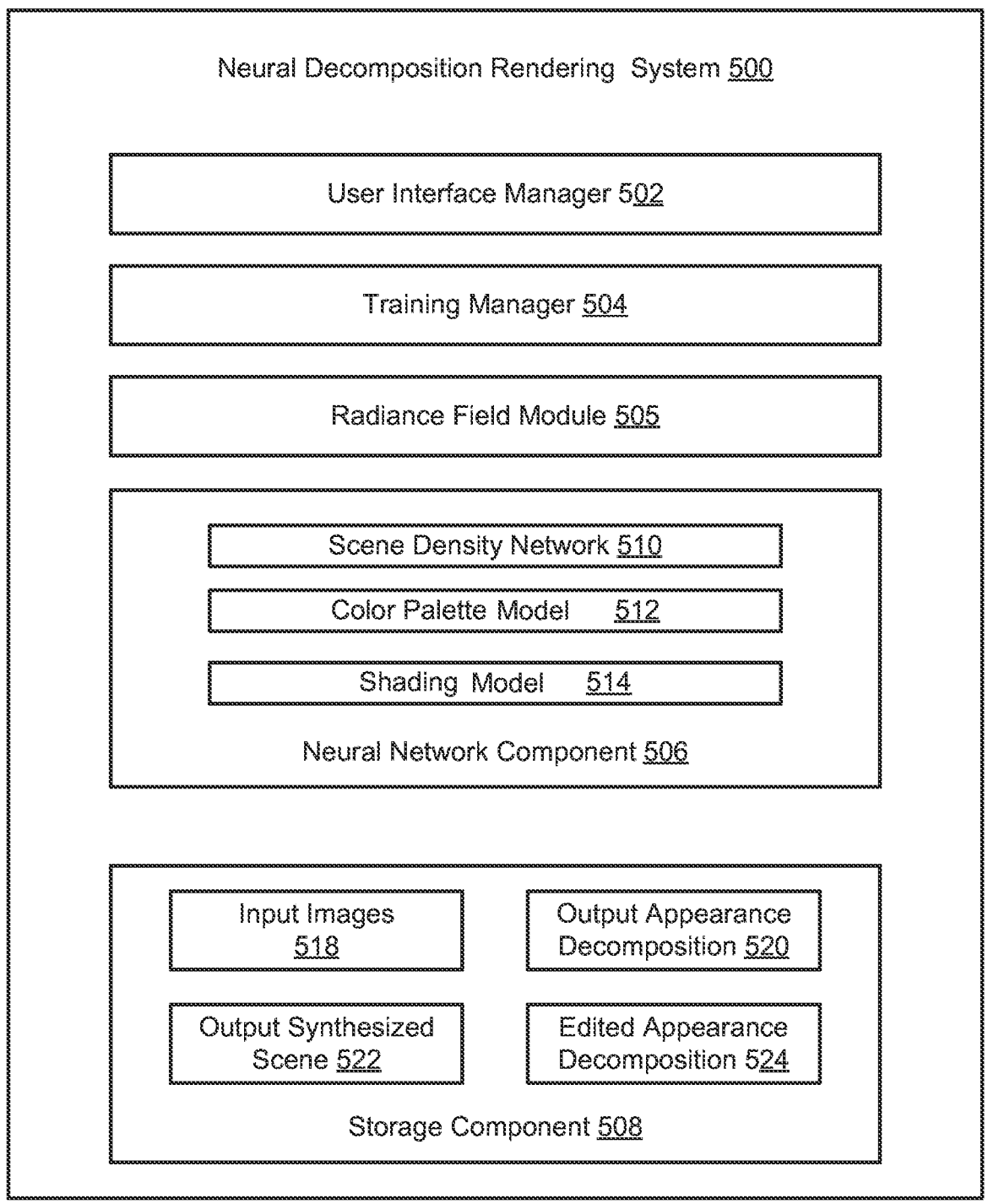
FIG. 5 is a block diagram of a schematic diagram of a neural decomposition rendering system, in accordance with embodiments of the present disclosure.

FIG. 5. Illustrates a schematic diagram of a neural decomposition rendering system 500 (e.g., "the scene rendering environment 100" and "the neural decomposition system 105" described above) in accordance with embodiments of the present disclosure. As shown, the neural decomposition rendering system 500 includes, but is not limited to, a user interface manager 502, a training manager 504, a radiance field module 505, a neural network component 506, and a storage component 508. The neural network component 506 includes a scene density network 510, a color palette model 512, and a shading model 514. The storage component 508 includes input images 518, an output appearance decomposition 520, an output synthesized scene 522, and an edited appearance decomposition 524.

The user interface manager 502 is a component of the neural decomposition rendering system 500 configured to allow users to provide input image data. In some embodiments, the user interface manager 502 provides a user interface through which the user provides the input images 518 representing a scene, as discussed above. For example, the user interface enables the user to upload the images and/or download the images from a local or remote storage location (e.g., by providing an address (e.g., a URL or other endpoint) associated with an image source). In some embodiments, the user interface can enable a user to link an image capture device, such as a camera or other hardware to capture image data and provided it to the neural decomposition rendering system 500. In some embodiments, the user interface manager 502 also enables the user to provide a specific viewpoint for a view to be synthesized. Additionally, the user interface manager 502 allows users to request neural decomposition rendering system 500 to produce an appearance decomposition for a synthesized scene relating to the input images 518. In some embodiments, the user interface manager 502 enables the user to directly edit the resulting appearance decomposition. Alternatively, as discussed above, the appearance decomposition can be edited in a graphics design system separate from the neural decomposition rendering system 500.

As illustrated in FIG. 5, the neural decomposition rendering system 500 also includes a training manager 504. The training manager 504 teaches, guides, tunes, and/or trains one or more neural networks. In particular, the training manager 504 can train a neural network based on a plurality of training data (e.g., the input images 518). The input images 518 include a plurality of images of a scene captured from a variety of viewpoints. More specifically, the training manager 504 can access, identify, generate, create, and/or determine training input and utilize the training input to train and fine-tune a neural network. In some examples, the training manager 504 trains the density network 510, the color palette model 512, and the shading model 514, end-to-end, as discussed above. In some embodiments, the networks are trained specifically for each scene. For example, a new network is trained (or an existing network retrained) to model a different scene.

As also illustrated in FIG. 5, the neural decomposition rendering system 500 includes a radiance field module 505. The radiance field module 505 implements ray marching techniques to generate a ray that is marched through each pixel and sample the ray at a plurality of 3D shading points. The radiance field module 505 can generate a plurality of rays that are marched and sampled accordingly. The resulting sampled points include a 3D point (x, y, z) and a viewing angle (0, 0) and are provided to the neural networks to process scene density/geometry and appearance (e.g., color, shading), as discussed.

As illustrated in FIG. 5, the neural decomposition rendering system 500 includes a neural network component 506. The neural network component 506 hosts a plurality of neural networks or other machine learning models, such as the density network 510, the color palette model 512, and the shading model 514. The neural network manager 506 includes an execution environment, libraries, and/or any other data needed to execute the machine learning models. In some embodiments, the neural network manager 506 is associated with dedicated software and/or hardware resources to execute the machine learning models. As discussed, the density network 510, the color palette model 512, and the shading model 514 can be implemented as MLPs, CNNs, or combinations of these or other types of neural networks.

Although depicted in FIG. 5 as being hosted by a single neural network manager 506, in various embodiments, the neural networks is hosted in multiple neural network managers and/or as part of different components. For example, a density manager (e.g., the density manager 120) can host the scene density network 510. Similarly, an appearance manager (e.g., the appearance manager 130) can host the color palette model 512 (e.g., the blending network 132, the phase function neural network 133) and the shading model 514 (e.g., the blending network 136, phase function neural network 137). In various embodiments, the appearance manager and the density manager can each include their own neural network manager, or other host environment, in which the respective neural networks execute.

In some embodiments, the sub-networks, the scene density network 510, the color palette model 512, and the shading model 514 are designed as MLP networks. Embodiments use unit vectors to represent a 3D point u=(x, y, z) and a viewing angle d=(θ, Ø). Embodiments use positional encoding to deduce high-frequency geometry and appearance details. In particular, embodiments apply positional encoding for the scene density network 510, the color palette model 512, and the shading model 514 on their respective input components, including u and d.

As illustrated in FIG. 5, the neural decomposition rendering system 500 also includes the storage component 508. The storage component 508 maintains data for the neural decomposition rendering system 500. The storage component 508 can maintain data of any type, size, or kind as necessary to perform the functions of the neural decomposition rendering system 500. The storage component 508, as shown in FIG. 5, includes the input images 518. The input images 518 can include a plurality of digital training images associated with a scene, as discussed in additional detail above. In particular, in one or more embodiments, the input images 518 include digital training images utilized by the training manager 504 to train the plurality of neural networks to generate an appearance decomposition decomposed from a synthesized scene (e.g., 3D model) for an object depicted in the scene.

As further illustrated in FIG. 5, the storage component 508 also includes the output appearance decomposition 520 that captures the appearance of the surface of the object depicted in the scene. The appearance decomposition can provide a color palette of the distinct colors on the synthesized scene as well as a shading effect associated with the synthesized scene due to the use of the color palette model 512 and/or the shading model 514. The output appearance decomposition 520 can be edited using conventional appearance editing techniques (e.g., to generate the edited appearance decomposition 524) to change the appearance of an object on a synthesized scene. The output synthesized scene 522 captures the density and geometry of the objects via regressed density values obtained from the scene density network 510. In some configurations, the storage component 508 also includes a modified version of the edited appearance decomposition 524. In some configurations, the edited appearance decomposition 524 includes a modified version of the output appearance decomposition 520. In some configurations, the edited appearance decomposition 524 has been edited using conventional appearance editing techniques via a graphics design application. For example, a new appearance decomposition changes the color of an object referenced within the output appearance decomposition 520 to generate the edited appearance decomposition 724.

Each component 502-508 of the neural decomposition rendering system 500 and their corresponding elements (as shown in FIG. 5) can be in communication with one another using suitable communication technologies. It will be recognized that although components 502-508 are shown to be separate in FIG. 5, any of the components 502-508 and their corresponding elements can be combined into fewer components, such as into a single facility or module, divided into more components, or configured into different components as can serve a particular embodiment.

The components 502-508 and their corresponding elements can comprise software, hardware, or both. For example, the component 502-508 and their elements can comprise one or more instructions stored on a computer-readable storage medium and executable by processors of one or more computing devices. When executed by the one or more processors, the computer-executable instructions of the neural decomposition rendering system 500 can cause a client device and/or a server device to perform the methods described herein. Alternatively, the component 502-508 and their corresponding elements can comprise hardware, such as a special purpose processing device to perform a certain function or group of functions. Additionally, the components 502-508 and their corresponding elements can comprise a combination of computer-executable instructions and hardware.

Furthermore, the components 502-508 of the neural decomposition rendering system 500 can, for example, be implemented as one or more standalone applications, as one or more modules of an application, as one or more plug-ins, as one or more library functions or functions that can be called by other applications, and/or as a cloud-computing model. Thus, the components 502-508 of the neural decomposition rendering system 500 can be implemented as a standalone application, such as a desktop or mobile application. Furthermore, the component 502-508 of the neural decomposition rendering system 500 can be implemented as one or more we-based applications hosted on a remote server. Alternatively, or additionally, the components of the neural decomposition rendering system 500 can be implemented in a suit of mobile device applications or "apps." To illustrate, the components 502-508 of the neural decomposition rendering system 500 can be implemented as part of an application, or suite of applications, including, but not limited to, ADOBE CREATIVE CLOUD, ADOBE PHOTOSHOP, ADOBE ACROBAT, ADOBE ILLUSTRATOR, ADOBE LIGHT ROOM and ADOBE INDESIGN. "ADOBE", "CREATIVE CLOUD", "PHOTOSHOP", "ACROBAT", "ILLUSTRATOR", "LIGHTROOM", and "INDESIGN" are either registered trademarks or trademarks of Adobe Inc. in the United States and/or other countries.

Thus, the illustrative embodiments in FIGS. 1-5 and described herein, provide various improvements over conventional methods. For example, embodiments generating an editable synthesized scene by integrating appearance decomposition in NeRF-based methods provide more efficient interaction mechanisms over the prior art. These interaction mechanisms allow users to edit complex synthesized scenes while avoiding unwanted artifacts. Embodiments that support color editing provide a more efficient color editing mechanism that not only edits the color of an object but also edits the reflection of that color on a surface. The color editing mechanism allows for multiple scene locations to be editable as they relate to the originating color. Furthermore, by applying neural basis functions for appearance decomposition, the present techniques provide a more efficient and robust editing technique to achieve high-quality and view-consistent appearance editing on a synthesized scene.

Figure 6:
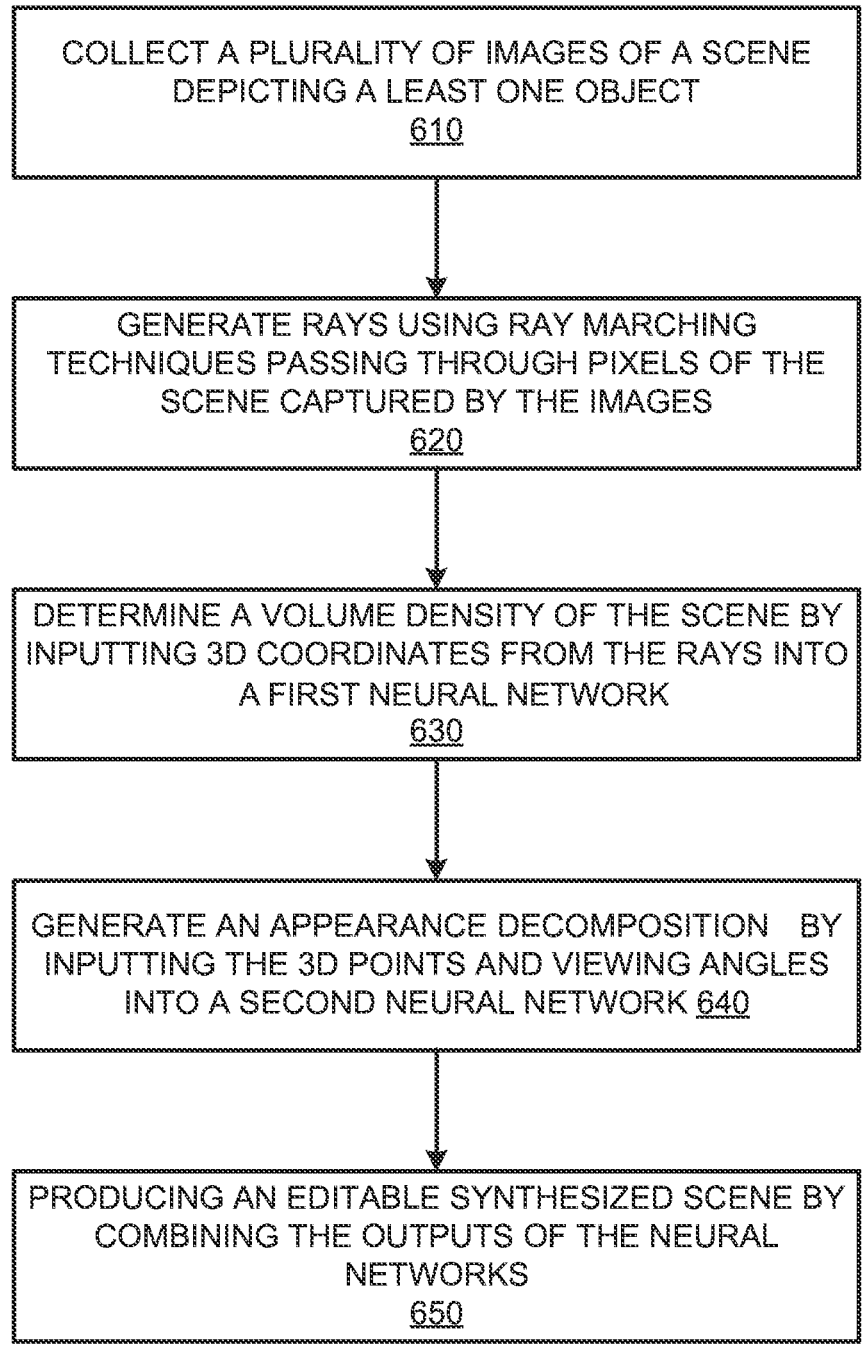
FIG. 6 illustrates a flowchart of a series of acts in a method of neural decomposition rendering and in accordance with embodiments of the present disclosure.
Figure 7:
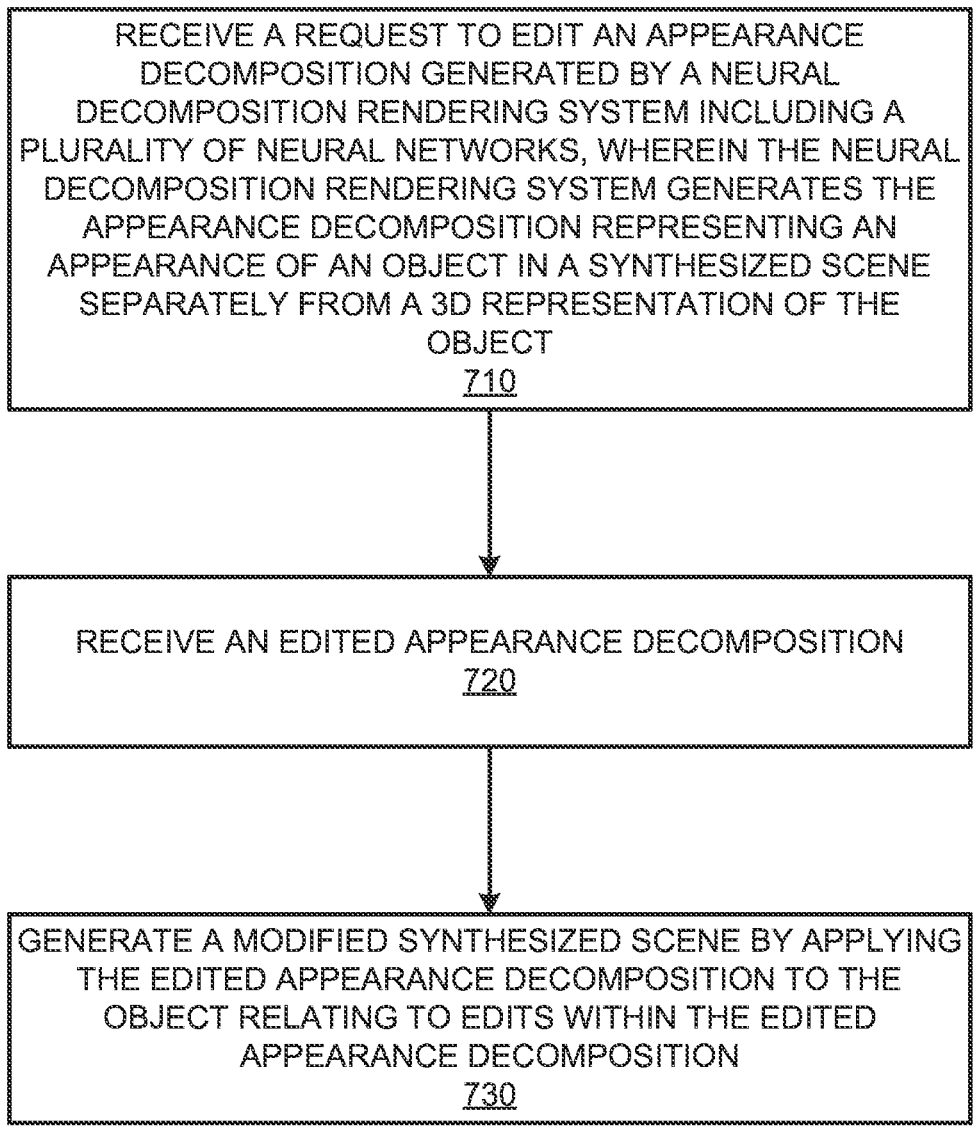
FIG. 7 illustrates a flow chart of a series of acts in a method of neural decomposition editing and in accordance with embodiments of the present disclosure.

In addition to the foregoing, embodiments can also be described in terms of flowcharts comprising acts and steps in a method for accomplishing a particular result. For example, FIGS. 6 and 7 illustrate flowcharts of exemplary methods in accordance with one or more embodiments. The methods described in relation to FIGS. 6 and 7 can be performed with fewer or more steps/acts or the steps/acts can be performed in differing orders. Additionally, the steps/acts described herein can be repeated or performed in parallel with one another or in parallel with different instances of the same or similar steps/acts.

Example Flow Diagrams

With reference now to FIGS. 6-7, flow diagrams are provided illustrating methods for generating editable synthesized views of scenes using neural radiance fields with neural basis decomposition. Each block of the methods 600 and 700 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

FIG. 6 illustrates a flowchart 600 of a series of acts in a method of neural decomposition rendering in accordance with one or more embodiments of the present disclosure. In one or more embodiments, the method 600 is performed in a digital medium environment that includes the neural decomposition rendering system 500. The method 600 is intended to be illustrative of one or more methods in accordance with the present disclosure and is not intended to limit potential embodiments. Alternative embodiments can include additional, fewer, or different steps that those articulated in FIG. 6.

As illustrated in FIG. 6, the method 600 includes an act 610 of collecting a plurality of images of a scene depicting at least one object. The plurality of images can include tens to hundreds of images of the scene capture from different viewpoints. The images can include digital images, frames of digital videos, or other visual content.

As illustrated in FIG. 6, the method 600 includes an act 620 of generating rays using ray marching techniques passing through pixels of the scene captured by the plurality of images. Each ray corresponds to 5D coordinates, including a 3D point (x, y, z) in space, and a viewing angle (0, 0) of the camera. To render a particular viewpoint, the rays are passed through the scene depicted in the plurality of images to generate a sampled set of 3D points and combine those 3D points of their corresponding 2D viewing direction/viewing angle. The sampled points with corresponding rays can be provided to a plurality of neural networks to regress volume density and radiance.

As illustrated in FIG. 6, the method 600 includes an act 630 determining a volume density of the scene using a first neural network to generate a 3D geometric representation of an object in the scene. In some embodiments, the first neural network is a scene density network trained to regress a volume density at a 3D point in the scene. The volume density indicates whether there is something located at that point and, if so, provides its corresponding density. As such, the scene density network can regress a 3D model of the scene from an arbitrary viewpoint.

As illustrated in FIG. 6, the method 600 includes an act 640 generating an appearance decomposition by inputting the 5D coordinates of the rays generated at act 620 into a second neural network. In some embodiments, the second neural network is a color palette model including a blending network, a phase function neural network, with a learnable parameter. The color palette model maps the 3D points of the scene to 2D coordinates of a radiance in the scene to produce a blending weight of the basis at the 3D point. This allows for the appearance of the object to be decomposed from the 3D model of the object, and further enables conventional editing techniques to be used to modify the appearance of the object by directly modifying the resulting appearance decomposition.

In some embodiments, the second neural network is a shading model, including a blending network, a phase function neural network, and a learnable parameter. The shading model maps the 5D coordinates to decompose the scene appearance into different shading terms. Each neural basis represents a shading component for a specific frequency domain. The higher the frequency is, the glossier the shading effect is. The shading model controls the frequency domain of a neural basis by adding the basis property to a sinusoidal positional embedding of the viewing directions of the rays. The result is an appearance decomposition that allows the shading effects (e.g., the diffuse and specular terms) to be editable.

In some embodiments, the color palette model 131 and the shading model 135 can be utilized together to provide an appearance decomposition include a color decomposition and a shading decomposition. The result is an appearance decomposition that enables conventional editing techniques to be used to modify both the color and the shading of a rendering.

As illustrated in FIG. 6, the method 600 includes an act 650 producing an editable synthesized scene by combining the 3D dimensional object of the scene produced by the first neural network with the appearance decomposition produced by the second neural network.

In various embodiments, the neural decomposition rendering system 500 includes a plurality of sub network (e.g., the first neural network and second neural network). The neural networks are implemented in some embodiments as multilayer perceptrons, convolutional neural networks, or combinations of these and other types of neural networks.

In some embodiments, the method further includes receiving a request to modify the 3D appearance representation of the object and modifying the appearance decomposition based on the request. For example, a graphic design system can implement the neural decomposition rendering system 500 or receive the appearance decomposition generated by the neural decomposition rendering system 500 and enable a user to modify the appearance decomposition. For example, modifying the color within the color palette of the appearance decomposition based on the request, can include replacing a color with a new color in the color palette included with the request to generate a modified appearance decomposition. With the appearance decomposition modified, arbitrary views of the object can be synthesized having a modified appearance (e.g., having a different color). For example, the method can include receiving a viewpoint, and generating a synthetic view of the scene based on the viewpoint using the 3D geometric representation of the object and the modified appearance decomposition.

FIG. 7 illustrates a flowchart of a series of acts in a method of neural decomposition-based editing in accordance with one or more embodiments. In one or more embodiments, the method 700 is performed in a digital medium environment that includes the neural decomposition rendering system 500. The method 700 is intended to be illustrative of one or more methods in accordance with the present disclosure and is not intended to limit potential embodiment. Alternative embodiments can include additional, fewer, or different steps than those articulated in FIG. 7.

As illustrated in FIG. 7, the method 700 includes an act 710 of receiving a request to edit an appearance decomposition generated by a neural decomposition rendering system including a plurality of neural networks, wherein the neural decomposition rendering system generates the appearance decomposition representing an appearance of an object in a scene separately from a 3D geometric representation of the object.

In some embodiments, the neural decomposition rendering system includes a scene density neural network to generate a 3D geometric representation of the object, a color palette neural network to produce an appearance decomposition comprising a color palette of the colors on the scene, a shading neural network to produce an appearance decomposition comprising a shading separation of the shading effects on the scene, and a volume rendering module to produce a synthesized scene of the 3D geometric representation of the object with an applied appearance decomposition. In some embodiments, the neural decomposition rendering system is trained using a plurality of images of the scene that depict the object, wherein the plurality of images of the scene are captured from a plurality of viewpoints.

As illustrated in FIG. 7, the method 700 includes an act 720 of receiving an edited appearance decomposition. For example, an appearance decomposition can be generated by a neural decomposition rendering system, as discussed above. In some configurations, the neural decomposition rendering system is implemented as part of a graphic design system or implemented as a separate system which makes the appearance decomposition available to a graphic design system for editing.

As illustrated in FIG. 7, the method 700 includes an act 730 of generating a modified synthesized scene based on the edited appearance decomposition and the request. In some embodiments, generating a modified synthesized scene further includes receiving a new appearance decomposition based on the color palette neural network and the shading neural network, and combining the appearance decompositions with the synthesized scene to generate the modified synthesized scene.

Example Computing Environment

Figure 8:
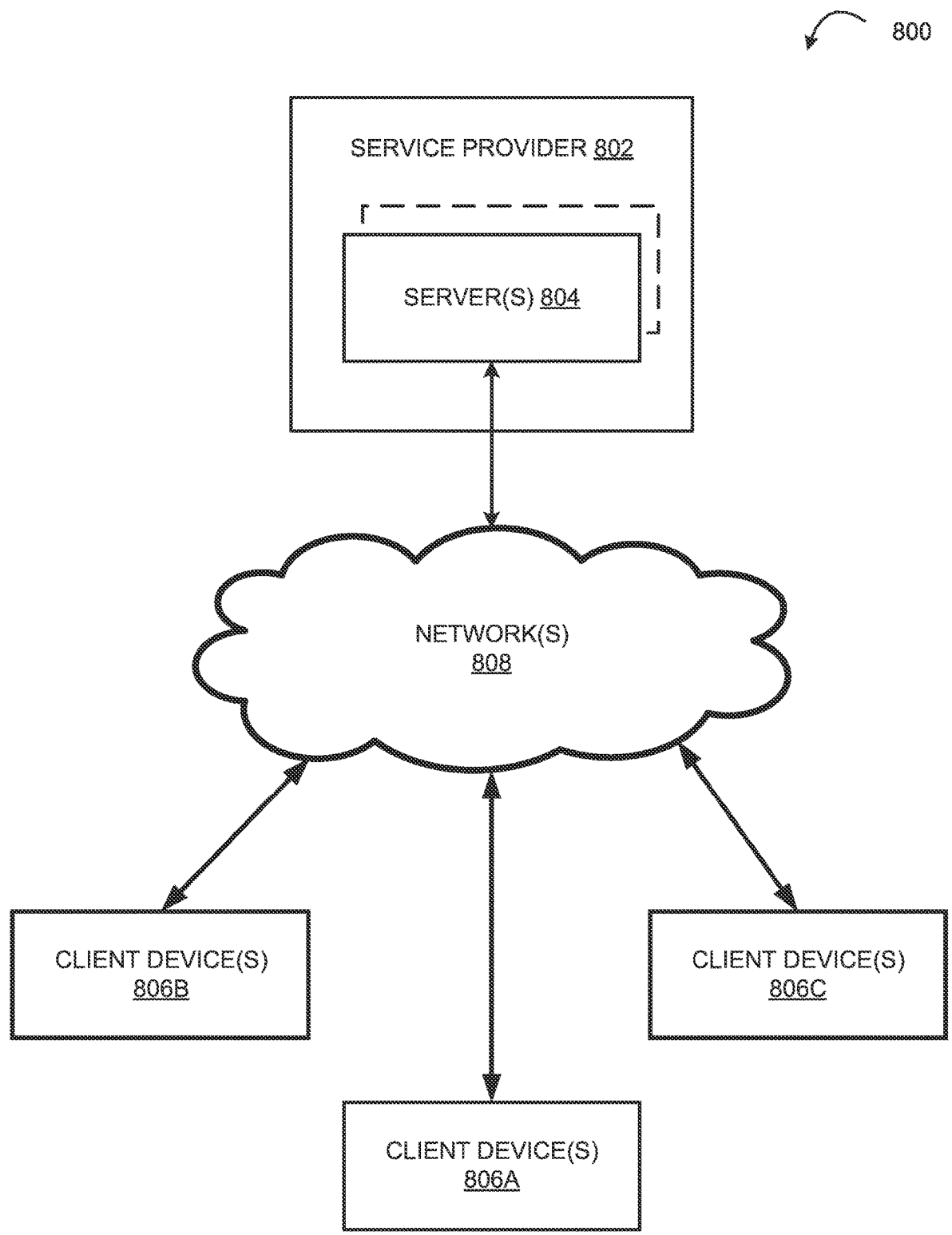
FIG. 8 illustrates a schematic diagram of an exemplary environment in which an image processing system can operate, in accordance with embodiments of the present disclosure.

FIG. 8 illustrates a schematic diagram of an exemplary computing environment 800 in which the neural decomposition rendering system 500 can operate in accordance with one or more embodiments of the present disclosure. In one or more embodiment, the computing environment 800 includes a service provider 802 which can include one or more servers 804 connected to a plurality of client devices 806A-806N via one or more networks 808. The client devices 806A-806N, the one or more networks 808, the service provider 802, and the one or more servers 804 can communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N can directly communicate with the one or more server 804, bypassing the network 808. Or alternatively, the client devices 806A-806JN can directly communicate with each other. The service provider 802 can be a public cloud serve provider which owns and operates their own infrastructure in one or more data centers and provides this infrastructure to customers and end users on demand to host applications on the one or more server 804.

The servers can include one or more hardware server (e.g., hosts), each with its own computing resources (e.g., processors, memory, disk space, networking bandwidth, etc.) which can be securely divided between multiple customers, each of which host their own applications on the one or more servers.

In some embodiments, the service provider can be a private cloud provider which maintains cloud infrastructure for a single organization. The one or more servers 804 can similarly include one or more hardware servers, each with its own computing resources, which are divided among applications hosted by the one or more servers for use by members of the organization or their customers.

Similarly, although the computing environment 800 of FIG. 8 is depicted as having various components, the computing environment 800 can have additional or alternative components. For example, the environment 800 can be implemented on a single computing device with the neural decomposition rendering system 500. In particular, the neural decomposition rendering system 500 can be implemented in whole or in part on the client device 802A.

As illustrated in FIG. 8, the environment 800 can include client devices 806A-806N. The client devices 806A-806N can comprise any computing device. For example, client devices 806A-806N can comprise one or more personal computers, laptop computers, mobile devices, mobile phones, tablets, special purpose computers, TVs, or other computing devices, including computing devices described below with regard to FIG. 8. Although three client devices are shown in FIG. 8, it will be appreciated that client devices 806A-806N can comprise any number of client devices (greater or smaller than shown).

Moreover, as illustrated in FIG. 8, the client devices 806A-806N and the one or more server 804 can communicate via one or more networks 808. The one or more networks 808 can represent a single network or a collection of networks (such as the Internet, a corporate Intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 can be any suitable network over which the client devices 806A-806N can access service provider 802 and server 804, or vice versa. The one or more networks 808 will be discussed in more detail below with regard to FIG. 9.

In addition, the environment 800 can also include one or more servers 804. The one or more servers 8004 can generate, store, receive, and transmit any type of data, including input images 518, output appearance decomposition 520, output synthesized scene 522, edited appearance decomposition 524, or other information. For example, a server 804 can receive data from a client device, such as the client device 806A, and send the data to another client device, such as the client device 802B and/or 802N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the neural decomposition rendering system 500. In particular, the neural decomposition rendering system 500 can comprise an application running on the one or more servers 804 or a portion of the neural decomposition rendering system 500 can be downloaded from the one or more servers 804. For example, the neural decomposition rendering system 500 can include a web hosting application that allows the client devices 806A-806N to interact with content hosted at the one or more servers 804. To illustrate, in one or more embodiments of the environment 800, one or more client devices 806A-806N can access a webpage supported by the one or more servers 1004. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide access to one or more digital images (e.g., the input image data 518, such as camera roll or an individual's personal photos) stored at the one or more servers 804. Moreover, the client device 806A can receive a request (i.e., via user input) to perform neural appearance decomposition and provide the request to the one or more servers 804. Upon receiving the request, the one or more servers 804 can automatically perform the methods and processes described above. The one or more servers 804 can provide all or portions of the 2D and/or 3D representations, to the client device 806A for display to the user. The one or more servers can also host a graphic design application used to edit the texture map to change the appearance of the 3D object.

As just described, the neural decomposition rendering system 500 can be implemented in whole, or in part, by the individual elements 802-808 of the computing environment 800. It will be appreciated that although certain components of the neural decomposition rendering system 500 are described in the previous examples with regard to particular elements of the computing environment 800, various alternative implementations are possible. For instance, in one or more embodiments, the neural decomposition rendering system is implemented on any of the client devices 806A-N. Similarly, in one or more embodiments, the neural decomposition rendering system 500 can be implemented on the one or more servers 804. Moreover, different components and functions of the neural decomposition rendering system 500 can be implemented separately among client devices 806A-806N, the one or more servers 804, and the network 808.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives (SSDs) (e.g., based on RAM), Flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological act, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, handheld devices, multiprocessor systems, microprocessor-based or programmable consumer electronics, network PCs, minicomputers, main frame computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud-computing environment" is an environment in which cloud computing is employed.

Example Operating Environment

Figure 9:
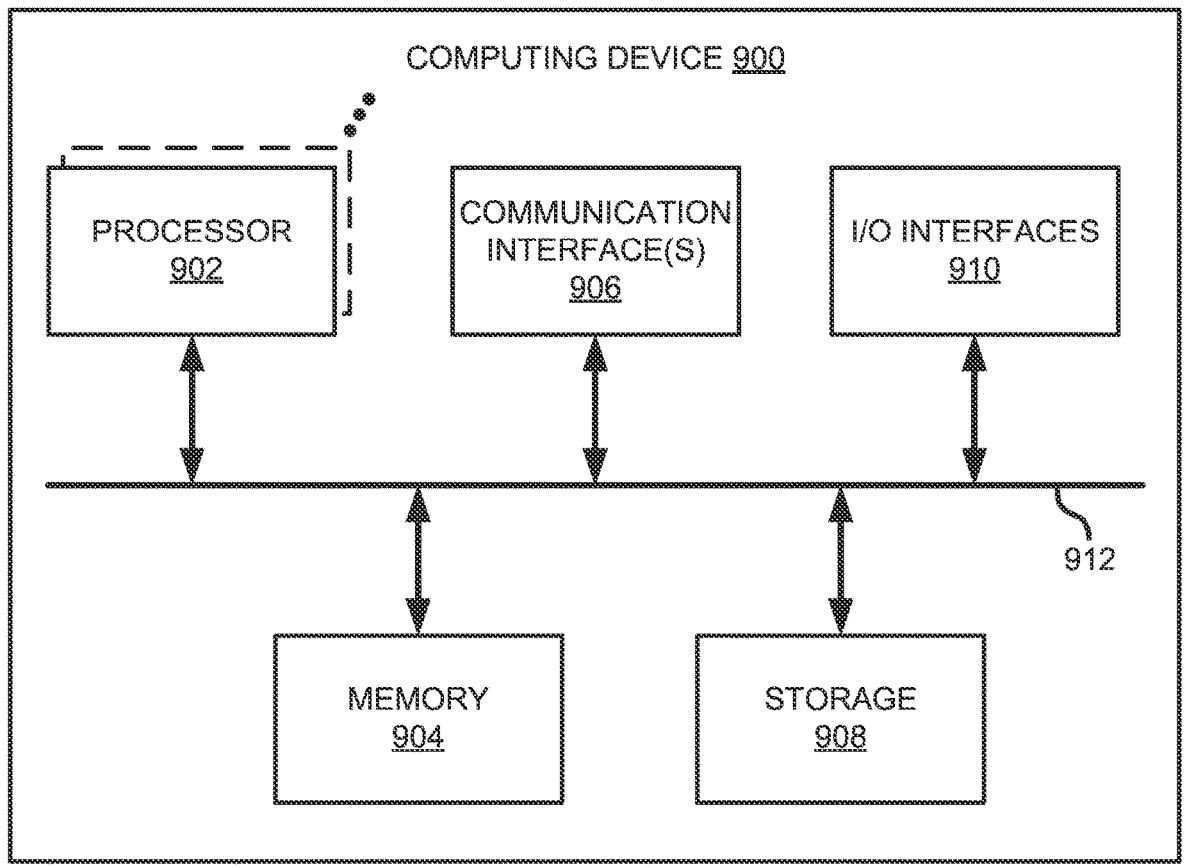
FIG. 9 illustrates a block diagram of an exemplary computing device, in accordance with embodiments of the present disclosure.

Having described an overview of embodiments of the present invention, an example operating environment in which some embodiments of the present invention are implemented is described below in order to provide a general context for various aspects of the present invention. Referring now to FIG. 9 in particular, an example operating environment for implementing embodiments of the present invention is shown and designated generally as computing device 900. Computing device 900 is but one example of a suitable computing environment and is not intended to suggest any limitation as to the scope of use or functionality of the invention. Neither should computing device 900 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules (e.g., including or referencing routines, programs, objects, components, libraries, classes, variables, data structures, etc.) refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

FIG. 9 illustrates, in block diagram form, an exemplary computing device 900 that can be configured to perform one or more of the processes described above. One will appreciate that one or more computing devices such as the computing device 900 can implement the image processing system. As shown by FIG. 9, the computing device can include a processor 902, memory 904, one or more communication interfaces 906, a storage device 908, and one or more I/O devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 can retrieve (or fetch) the instructions from an internal register, an internal cache, memory 904, or a storage device 908 and decode and execute them. In various embodiments, the processor(s) 902 can include one or more central processing units (CPUs), graphics processing units (GPUs), field programmable gate arrays (FPGAs), systems on chip (SOC), or other processor (s) or combinations of processors.

The computing device 900 includes memory 904, which is coupled to the processor(s) 902. The memory 904 can be used for storing data, metadata, and programs for execution by the processor (s). The memory 904 can include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 can be internal or distributed memory.

The computing device 900 can further include one or more communication interfaces 006. A communication interface 906 can include hardware, software, or both. The communication interface 906 can provide one or more interfaces for communication (such as, for example, packet-based communication) between the computing device and one or more other computing devices 1100 or one or more networks. As an example, and not by way of limitation, communication interface 1106 can include a network interface controller ("NIC") or network adapter for communicating with an Ethernet or other wire-based network or a wireless NIC ("WNIC") or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 can include a hard disk drive ("HDD"), flash memory, a Universal Serial Bus ("USB") drive or a combination these or other storage devices. The computing device 1100 also includes one or more input or output ("I/O") devices/interfaces 910, which are provided to allow a user to provide input to (such as user strokes), receive output from, and otherwise transfer data to and from the computing device 900. These I/O devices/interfaces 910 can include a mouse, keypad or a keyboard, a touch screen, camera, optical scanner, network interface, modem, other known I/O devices or a combination of such I/O devices/interfaces 910. The touch screen can be activated with a stylus or a finger.

The I/O devices/interfaces 910 can include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data can be representative of one or more graphical user interfaces and/or any other graphical content as can serve a particular implementation.

Having identified various components in the present disclosure, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described. For purposes of this disclosure, words such as "a" and "an," unless otherwise indicated to the contrary, include the plural as well as the singular. Thus, for example, the requirement of "a feature" is satisfied where one or more features are present.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. A computer-implemented method comprising:
   collecting a set of input images of a scene depicting an object;
   generating a plurality of rays of the scene from the set of input images, wherein the rays correspond to three-dimensional coordinates and viewing angles;

determining a volume density of the scene by inputting the three-dimensional coordinates of the rays into a first neural network to generate a 3D geometric representation of the object;

generating an appearance decomposition by inputting the three-dimensional coordinates and the viewing angles of the rays into a second neural network; and producing an editable synthesized object by combining the 3D geometric representation of the object and the appearance decomposition using a volume rendering technique.

2. The computer-implemented method of claim 1, wherein the appearance decomposition allows for colors appearing on the editable synthesized object to be changed.

3. The computer-implemented method of claim 2, wherein the colors are a sum of colors of each basis provided by the rays provided by a product of a blending weight of each basis, a monochromatic radiance value, and an optimization parameter.

4. The computer-implemented method of claim 1, wherein the appearance decomposition allows for shading effects appearing on the editable synthesized object to be changed.

5. The computer-implemented method of claim 1, wherein the first neural network and the second neural network are multilayer perceptrons.

6. The computer-implemented method of claim 1, wherein the second neural network includes a blending weight neural network and a phase function neural network that predicts a monochromatic radiance value as the appearance decomposition.

7. The computer-implemented method of claim 1, wherein the second neural network includes a blending weight neural network and a phase function neural network with a basis property added to a sinusoidal positional embedding of the phase function neural network to predict a shading term value as the appearance decomposition.

8. The computer-implemented method of claim 1, further comprising:

receiving a request to modify the 3D geometric representation of the object; and modifying the appearance decomposition based on the request.

9. The computer-implemented method of claim 8, further comprising:

receiving a viewpoint; and generating a synthetic view of the scene based on the viewpoint using the 3D geometric representation of the object and the modified appearance decomposition.

10. A non-transitory computer readable storage medium including instructions stored thereon which, when executed by a processor, cause the processor to:

generate a plurality of rays of the scene from a set of input images, wherein the rays include three-dimensional coordinates and viewing angles;

determine a volume density of the scene by inputting the three-dimensional coordinates from the rays into a first neural network to generate a 3D geometric representation of the object;

generate an appearance decomposition by inputting the three-dimensional coordinates and the viewing angles of the rays into a second neural network;

produce an editable synthesized object within the scene by combining the 3D geometric representation of the object and the appearance decomposition using a volume rendering technique.

11. The non-transitory computer readable storage medium of claim 10, wherein the appearance decomposition allows for colors appearing on the editable synthesized object to be changed.

12. The non-transitory computer readable storage medium of claim 11, wherein the colors are a sum of colors of each basis provided by the rays provided by a product of a blending weight of each basis, a monochromatic radiance value, and a optimization parameter.

13. The non-transitory computer readable storage medium of claim 10, wherein the appearance decomposition allows for shading effects appearing on the editable synthesized object to be changed.

14. The non-transitory computer readable storage medium of claim 10, wherein the first neural network and the second neural network are multilayer perceptrons.

15. The non-transitory computer readable storage medium of claim 10, wherein the second neural network includes a blending weight neural network and a phase function neural network that predicts a monochromatic radiance value as the appearance decomposition.

16. The non-transitory computer readable storage medium of claim 10, wherein the second neural network includes a blending weight neural network and a phase function neural network with a basis property added to a sinusoidal positional embedding of the phase function neural network to predict a shading term value as the appearance decomposition.

17. The non-transitory computer readable storage medium of claim 10, wherein the instructions, when executed, further cause the processor to:

receive a request to modify the 3D geometric representation of the object; and modify the appearance decomposition based on the request.

18. The non-transitory computer readable storage medium of claim 17, wherein the instructions, when executed, further cause the processor to:

receive a viewpoint; and generate a synthetic view of the scene based on the viewpoint using the 3D geometric representation of the object and the modified appearance decomposition.

19. A system comprising:

one or more processors; and one or more non-transitory computer storage media storing instructions that, when used by the one or more processors, cause the one or more processors to perform operations comprising:

receiving a request to edit an appearance decomposition generated by a neural decomposition rendering system including a plurality of neural networks, wherein the neural decomposition rendering system generates the appearance decomposition representing an appearance of an object in a scene separately from a 3D geometric representation of the object;

obtaining an edited appearance decomposition based on the request; and generating a modified appearance decomposition based on the edited appearance decomposition.

20. The system of claim 18, the operations further comprising:

receiving a viewpoint; and generating a synthetic view of the scene based on the viewpoint using the 3D geometric representation of the object and the modified appearance decomposition.

\* \* \* \* \*